US012475858B2

(12) United States Patent
Rajagopalan et al.

(10) Patent No.: US 12,475,858 B2
(45) Date of Patent: Nov. 18, 2025

(54) PER-SEGMENT CHANGE DETECTION FOR MULTI-SEGMENTED BACKLIGHT

(71) Applicant: Intel Corporation, Santa Clara, CA (US)

(72) Inventors: Geethacharan Rajagopalan, Gold River, CA (US); Roland Peter Wooster, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 17/856,723

(22) Filed: Jul. 1, 2022

(65) Prior Publication Data

US 2022/0335908 A1 Oct. 20, 2022

(51) Int. Cl.
*G09G 3/34* (2006.01)
*G09G 3/36* (2006.01)

(52) U.S. Cl.
CPC ......... *G09G 3/3426* (2013.01); *G09G 3/3648* (2013.01); *G09G 2310/08* (2013.01); *G09G 2320/0646* (2013.01); *G09G 2360/16* (2013.01)

(58) Field of Classification Search
CPC . G09G 3/3426; G09G 3/3648; G09G 2310/08
See application file for complete search history.

(56) References Cited

U.S. PATENT DOCUMENTS

2014/0152715 A1* 6/2014 Wen ......................... G09G 3/20
345/691

* cited by examiner

*Primary Examiner* — Gerald Johnson
(74) *Attorney, Agent, or Firm* — Banner & Witcoff, Ltd.

(57) ABSTRACT

Particular embodiments described herein provide for an electronic device that includes a display panel that includes a segmented backlight and a display engine, where, for each segment in the segmented backlight, the display engine communicates to the display panel an identifier that indicates if a brightness value of the segment in a next frame in a video stream will change from a brightness value of the segment in a current frame in the video stream. The display panel can include a timing controller (TCON) and the TCON uses the identifier for each segment in the segmented backlight to determine if a brightness of a specific backlight segment for the next frame can be a same level as a brightness of the specific backlight segment for the current frame.

20 Claims, 7 Drawing Sheets

PER-SEGMENT CHANGE DETECTION FOR MULTI-SEGMENTED BACKLIGHT

TECHNICAL FIELD

This disclosure relates in general to the field of computing, and more particularly, to per-segment change detection for a multi-segmented backlight.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
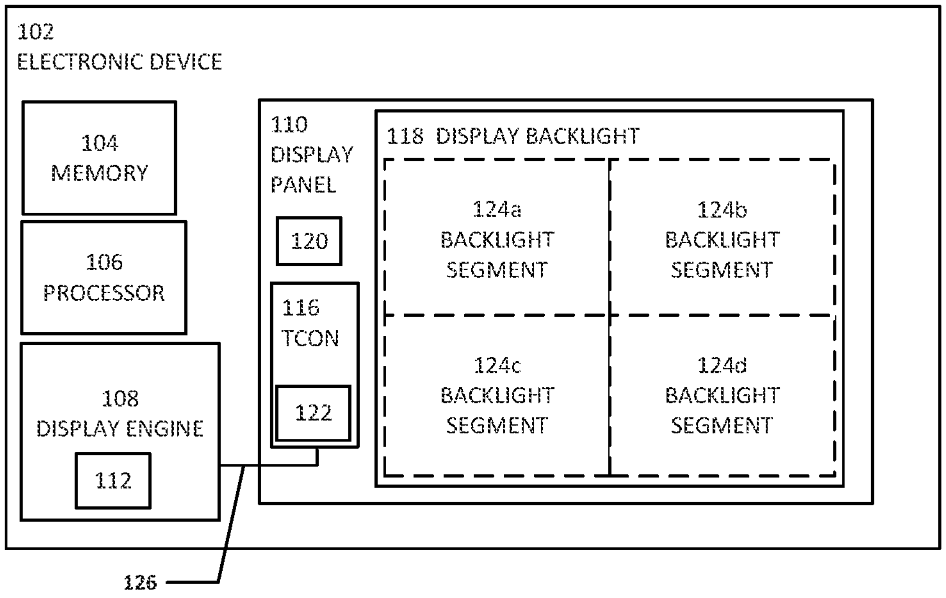
FIG. 1 is a simplified block diagram of a system to enable per-segment change detection for a multi-segmented backlight, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling per-segment change detection for a multi-segmented backlight in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

As used herein, the term "last processed frame" includes a frame (an individual image in a video stream) that was processed by a display engine (e.g., the display engine 108) and was sent to a timing controller (TCON) (e.g., the TCON 116). The last processed frame was used by the CON to create a current displayed frame. As used herein, the term "current displayed frame" includes a frame that is currently being displayed on the display.

As used herein, the term "current processed frame" includes a frame currently being processed by the display engine. The current processed frame is the frame that is processed by the display engine after the last processed frame. The current processed frame is sent to the TCON and the TCON uses the current processed frame to create a next displayed frame. The term "next displayed frame" includes the frame that will be displayed on the display after the current displayed frame.

In an example, an electronic device can include one or more processors, a display engine and a display panel. The display engine can include a backlight segment change engine. The display panel can include a TCON and a segmented backlight. One of the one or more processors can be a central processing unit for the electronic device. The central processing unit and/or the display engine can determine the portions of a current processed frame that changed and the portions of the current processed frame that did not change as compared to the last processed frame. More specifically, the central processing unit and/or the display engine can determine the portions of the current processed frame that changed based on various factors such as display flips on the enabled planes, plane position, plane scaling, per plane change rectangle programmed by the driver, etc. The portions of the current processed frame that did not change are mapped to a segment in the segmented backlight by the backlight segment change engine. For the segments in the segmented backlight that include the portions of the current processed frame that did not change, the TCON can use the luminance values of the current displayed frame for the backlight as the luminance values for the next displayed frame, without the need for an additional margin, leading to power savings and improved visual experience.

The central processing unit and/or the display engine can determine the portions of a current processed frame that changed and the portions of the current processed frame that did not change as compared to the last processed frame before the display engine actively starts processing the first active pixel of the next displayed frame and this allows the display engine to transmit a per-segment luminance change indicator to the TCON during the blanking region before the current processed frame pixels are sent and converted by the TCON to the next displayed frame. In some examples, the display engine will convey the luminance information over DisplayPort and HDMI transmission link using the standard Secondary Data Packets (SDPs).

For the segments with no change in luminance in the next displayed frame, the display panel can drive the brightness of the backlight in the segments with no change in luminance based on the brightness of the backlight of the current displayed frame, without the need for an additional margin, leading to power savings and improved visual experience. In general, the higher the luminance, the higher the brightness. More specifically, the luminance is the level (e.g., power level) of a backlight and the brightness is the amount of light from the backlight. the Most common hours of battery life usages like word processing applications and browsing have a relatively low frame rate and often only some portions of the screen changes between displayed frames. Because the required backlight brightness in the static segments is known, the luminance for static segments in the next displayed frame can be the same luminance as the luminance of the current displayed frame. For backlight segments in the next displayed frame where the image being displayed is dynamic and changing, the backlight for the segments that are changing will still need to be driven at a higher brightness than the segments in the current displayed frame so the system does not underestimate the brightness level required of the backlight for the next displayed frame.

A display specification (e.g., the EDID/DisplayID block in the display panel) can include details that expose the backlight segment dimensions to the display engine. The display engine can read the information as part of the initialization of the system and program the backlight segment dimensions in the display pipeline. A TCON can receive the luminance information for each backlight segment from the display engine. In some examples, the TCON can read the metadata in the existing standard secondary data packets (SDPs) packets, receive and interpret the backlight luminance change data in the SDP packets, and use the information in calculating the backlight zone power levels per backlight segment. For all the segments that did not change luminance, the backlight engine can drive the brightness of the backlight for the next displayed frame based on the segment luminance from the current displayed frame, without adding the typical luminance margin that typically wastes power because the backlight is driven to a higher brightness than is needed. In some examples, the system can track the luminance change in the display engine pipeline and transfer this luminance change information to the display panel over the DisplayPort and HDMI transmission link using the SDPs. The luminance change determination is at least partially based on the frame change tracking capability in hardware and relies on the fact that most common hours of battery life utilize a very low frame rate. Also, often the displayed frame change is further limited to a subsection of the displayed frame where only a few of the backlight segments are being changed.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation. For example, about one (1) millimeter (mm) would include one (1) mm and ±0.2 mm from one (1) mm.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

Example Electronic Device

FIG. 1 is a simplified block diagram of an electronic device 102 configured to enable per-segment change detection for a multi-segmented backlight, in accordance with an embodiment of the present disclosure. In an example, the electronic device 102 can include memory 104, one or more processors 106, a display engine 108, and a display panel 110. The display engine 108 can include a backlight segment change engine 112. The display panel 110 includes a timing controller (TCON) 116, a display backlight 118, a display specification 120, a display backplane (illustrated in FIG. 2), and a liquid crystal panel (illustrated in FIG. 2). The TCON 116 can include a backlight engine 122. The display backlight 118 includes a plurality of backlight segments 124. For example, as illustrated in FIG. 1, the display backlight 118 includes the backlight segments 124*a*-124*d*. Each of the plurality of backlight segments 124 can be independently controlled by the backlight engine 122. Note that while FIG. 1 illustrates four (4) backlight segments, the display backlight 118 can include more than four (4) backlight segments 124 and the number of backlight segments 124 depends on design choice and system constraints. The display engine 108 can communicate with the display panel 110 using a display interface 126. In some examples, the display panel 110 can support high dynamic range.

One of the one or more processors 106 can be a central processing unit. The display engine 108 can be a processor, a core of a processor, part of a core of a processor, a dedicated graphics processor, a core of a graphics processor, part of a core of a graphics processor, or a graphics engine. The display engine 108 may be located on a system on chip (SoC). The display engine 108 is responsible for transforming mathematical equations into individual pixels and frames and communicating the individual pixel and frames to the TCON 116. The TCON 116 is a timing controller on the display side. The TCON 116 receives the individual frames generated by the display engine 108, corrects for color and brightness, controls the refresh rate, backlight, controls power savings of the display panel 110, touch (if enabled), etc. and is responsible for sending signals to the display backplane that will generate the image on the display panel 110. The TCON 116 is responsible for controlling each of the backlight segments 124 in the display backlight 118 using the backlight engine 122.

In an illustrative example, for a current processed frame to be sent to the TCON 116, the display engine 108 can determine the backlight segments 124 that are static with no change in luminance as compared to the last processed frame and/or the backlight segments 124 that are not static with a change in luminance as compared to the last processed frame. For the backlight segments 124 that are static with no change in luminance, the current displayed frame's luminance for the backlight segment can be reused for the next displayed frame. More specifically, for the backlight segments 124 that are static with no change in luminance, the brightness level of the backlight for the backlight segment of the current displayed frame can be reused for the next displayed frame. The display engine 108 can communicate to the TCON 116 an indicator or identifier that indicates or identifies the backlight segments 124 where the brightness values change and/or the backlight segments 124 that are static with no change in the brightness value. The indicator or identifier can be sent from the display engine 108 to the TCON 116 over the display interface 126. In some examples, the indicator or identifier can be sent from the display engine 108 to the TCON 116 over the display interface 126 using SDPs. The SDPs can be sent in the vertical blanking region before the active frame pixels are delivered. For all the backlight segments 124 that are static with no change in brightness, the TCON 116 can drive the backlight of the backlight segment according to the required luminance of the current displayed frame, without the need for an additional margin, leading to power savings and improved visual experience. This allows the system to help enable improved panel backlight handling with intelligent per-segment luminance change-tracking assistance from the display engine 108, without a need for a TCON frame buffer and additional latency.

Unless the display engine 108 has a full frame buffer, which would lead to unwanted latency issues, the display engine 108 does not have a copy of the last processed frame sent to the TCON 116 and must derive the area or areas that are changing from a last processed frame to a current processed frame. To derive the area or areas that are changing from a last processed frame to a current processed frame, the one or more processors 106 (especially if one of the processors 106 is a central processing unit) and/or the display engine 108 track changes of the current processed frame as compared to the last processed frame. More specifically, the one or more processors 106 (e.g., a central processing unit) and/or the display engine 108 can use track flip programming, flip dirty-rectangle programming, determine if any multiple plane overlay planes are flipped, track pipe/plane scaler usage to identify unchanged segments, or some other means to track changes to the current processed frame as compared to the last processed frame. In some examples, the one or more processors 106 and/or the display engine 108 can use the coordinates of a flip to see what areas of the display are changing. Also, in other examples, if multi-layer compositing is used to create the image on the display, the layers can be analyzed to determine what layer, if any, is changing. Once the parts of the display that are changing are identified, the display engine 108 can determine what backlight segments of the display include the parts that are changing and then send a signal to the TCON that the backlight brightness will change in only those backlight segments and the other backlight segments will not be changing. The TCON 116 can drive the backlight in the backlight segments of the next displayed frame where the brightness will not be changing according to the required luminance of the current displayed frame.

Various embodiments described herein generally involve techniques to communicate display data to one or more display devices through the display interface 126 (e.g., display port, HDMI, DVI, Thunderbolt, etc.) that provides for the communication of display data between a computing device and a display device. For example, the display engine 108 may transmit display data to the display panel 110 using the display interface 126. The display data includes indications of an image to be displayed. For example, the display data includes information (e.g., RGB color data, etc.) corresponding to pixels of the display, that when communicated over the display interface 126, allows the display panel 110 to display an image (e.g., on a screen that has a backlight, etc.). Various display interfaces exist and the present disclosure is not intended to be limited to a particular display interface. Furthermore, the number of pixels and the displayable colors for each pixel varies for different displays. The number of pixels, the displayable colors, the display type, and other characteristics that may be referenced herein are referenced to facilitate understanding and are not intended to be limiting.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

For purposes of illustrating certain example techniques of electronic device 102, the following foundational information may be viewed as a basis from which the present disclosure may be properly explained. A number of prominent technological trends are currently afoot (e.g., more computing devices, more online video services, more Internet traffic, etc.), and these trends are changing the media delivery landscape. One change is the use of a display. Generally, a display is an output device that displays information in pictorial form to a user.

Early electronic computers were fitted with a panel of light bulbs where the state of each particular bulb would indicate the on/off state of a particular register bit inside the computer. This allowed the engineers operating the computer to monitor the internal state of the machine and this panel of lights came to be known as the 'monitor.' As early monitors were only capable of displaying a very limited amount of information and were very transient, they were rarely considered for program output. Instead, a line printer was the primary output device and the monitor was limited to keeping track of the program's operation. Some of the first computer monitors used cathode ray tubes (CRTs). However, computer monitors that use CRTs are typically large heavy devices.

LCDs were created to reduce the size, weight, power consumption, etc. of displays. As computers became portable, the primary use of LCD technology as computer monitors was in laptops where the lower power consumption, lighter weight, and smaller physical size of the LCD justified the higher price of an LCD versus a CRT display. The dynamic range of early LCD panels was very poor and although text and other motionless graphics were sharper than on a CRT, an LCD characteristic known as pixel lag caused moving graphics to appear noticeably smeared and blurry. Current LCDs offer better resolution and other advantages over CRT displays and most displays available today are LCDs.

Generally, a display (e.g., computer display, computer monitor, monitor, etc.) is an output device that displays information in pictorial form. The most common type of display is an LCD. There are multiple technologies that have been used to implement LCDs and LCDs are used in a wide range of applications, including LCD televisions, computer monitors, instrument panels, aircraft cockpit displays, and indoor and outdoor signage. Small LCD screens are common in portable consumer devices such as digital cameras, watches, calculators, and mobile telephones, including smartphones. LCD screens are also used on consumer electronics products such as DVD players, video game devices, and clocks. LCD screens have replaced heavy, bulky CRT displays in nearly all applications. LCD screens are available in a wider range of screen sizes than CRTs and plasma displays, with LCD screens available in sizes ranging from tiny digital watches to very large television receivers.

LCDs are available to display arbitrary images (as in a general-purpose computer display) or fixed images with low information content that can be displayed or hidden, such as preset words, digits, and seven-segment displays as in a digital clock. LCDs that display arbitrary images use the same basic technology, except the arbitrary images are made from a matrix of small pixels, while other displays have larger elements. LCDs can either be normally on (positive) or off (negative), depending on the polarizer arrangement. For example, a character positive LCD with a backlight will have black lettering on a background that is the color of the backlight and a character negative LCD will have a black background with the letters being of the same color as the backlight. In white on blue LCDs, optical filters are added to give the LCDs their characteristic appearance.

Typically, an LCD display (commonly referred to as an LCD screen, LCD panel, or just an LCD) is a flat-panel display or other electronically modulated optical device that uses the light-modulating properties of liquid crystals combined with polarizers. Liquid crystals do not emit light directly and instead a backlight or reflector is used to produce images in color or monochrome. Because LCDs produce no light of their own, they require external light to produce a visible image. In a transmissive type of LCD, the light source is provided at the back of a glass stack and is called a backlight. There are several methods of backlighting an LCD display using LEDs, including the use of either white or red, green, and blue (RGB) LED arrays behind the panel and edge-LED backlighting (e.g., white LEDs around the inside frame of a television and a light-diffusion panel to spread the light evenly behind the LCD panel). Most current LCDs have a backlight behind a liquid crystal array. The liquid crystals have red, green, and blue filters and to obtain red light, the light from the backlight is filtered through the red filter, to obtain green light, the light from the backlight is filtered through the green filter, and to obtain blue light, the light from the backlight is filtered through the blue filter. A switch is used to control the light going through the filters. A LED-backlit LCD is a display that uses LED backlighting instead of traditional cold cathode fluorescent (CCFL) backlighting.

Currently, most LCD screens are designed with an LED backlight instead of the traditional CCFL backlight and the backlight is dynamically controlled with the video information (dynamic backlight control). The combination of reflective polarizers and prismatic films with the dynamic backlight control can help to increase the dynamic range of the display system. Some LCD backlight systems are made more efficient by applying optical films such as a prismatic structure to gain the light into the desired viewer directions and by using reflective polarizing films that recycle the polarized light that was formerly absorbed by the first polarizer of the LCD. These polarizers consist of a large stack of uniaxial oriented birefringent films that reflect the former absorbed polarization mode of the light. Such reflective polarizers typically use uniaxial oriented polymerized liquid crystals (birefringent polymers or birefringent glue).

One trend in LCDs is high dynamic range (HDR). HDR is an emerging technology that enables a user to view relatively good quality images, including higher contrast ratio, a darker black state, more gray levels, and more vivid colors as compared to standard dynamic range (SDR) displays that do not have HDR capability. There are several formats for HDR including HDR10, Dolby vision, HDR10+, hybrid log-gamma ten (HLG10), PQ10 or PQ format, technicolor advanced HDR, single layer (SL)-HDR1, SL-HDR2, SL-HDR3, and other formats. Displays that can support HDR can usually offer brighter highlights and a wider range of color detail as compared to SDR displays that do not have HDR capability. For an organic light-emitting diode (OLED) display, it is relatively easy to obtain a true black state, but obtaining a brightness over 1000 nits in an OLED display can lead to a compromised lifetime that is unacceptable to most consumers. On the contrary, it is relatively easy to boost an LCD's peak brightness to 1000 nits, but to lower the dark state to less than 0.01 nits is challenging. If a LCD's contrast ratio can be improved, then more grayscales can be displayed. One promising to candidate improve an LCD's contrast ratio is to use local dimming.

Most local dimming algorithms split the image frame into corresponding zones that align with the local dimming backlight zones. Note that the "zones" are arbitrary zones and are not the same as a segmented backlight. Once the image has been split into zone segments, the brightest pixel is found in each zone. The brightest pixel is used to set the theoretical power level required for that backlight zone as no pixel needs to be brighter than the level of the brightest pixel in that zone. Once the backlight's power level has been determined for a particular zone, then the LCD transparency can be calculated for each pixel in that zone. For a fixed backlight power level, the LCD transparency is changed from almost black to transparent to adjust the amount of light coming through from the backlight. Filters (red, green, and blue) on the LCD filter the light and create the colors for each pixel.

The problem that TCONs suffer when calculating the backlight brightness is that the TCON does not have a full frame buffer to save the whole video frame into, then analyze for the brightest pixel, and then calculate the backlight power and change the transparency. Instead, the TCON only has a few lines of buffer, scanning from the top of the frame to the bottom. By the time the TCON starts rendering or painting the image on the screen, the TCON has no idea how bright the following pixels on the same frame will become and thus it is impossible for the TCON to determine what power level for the backlight to use for the next displayed frame based on data that has not yet been received. So instead, the TCON calculates the backlight power based on the brightest pixel in the corresponding local dimming zone of the current displayed frame. This means the TCON's knowledge of the most suitable backlight power level is always lagging the actual video by one frame.

The consequence of always being one frame behind is that if the next displayed frame is brighter than the current displayed frame, any previous calculations would have underestimated the brightness level required of the backlight. This presents a choice of two bad options for the TCON, either to frequently underestimate how bright the next displayed frame will be and to clip the highlights when they get brighter, or to run the backlight brighter than really necessary to provide some margin to allow for the next displayed frame to become brighter without clipping. Utilizing the second of these two options is often why HDR backlights use more power than SDR backlights even when displaying the same content at the same luminance level.

Typically, in current HDR systems, especially HDR laptops, the backlight is run about fifty percent brighter than necessary. This results in several negative consequences, including having the backlight power consumption being about fifty percent higher than necessary. Also, system battery life is lower, often by about twenty percent to about thirty percent. Further, due to the increased intensity of the backlight, the light leakage through the LCD panel is higher, so blacks are not quite as black as compared to when the display is in SDR mode and for scenarios where local dimming can't be used (e.g., white text on a black background), the contrast ratio of the screen is reduced by about thirty-three percent (33%).

Multi segmented LCD displays, especially HDR panels, control their backlight sub-optimally and local dimming algorithms implemented in some devices do not dim the backlight zones as aggressively as possible. Instead, these systems run the backlights brighter than necessary leading to increase in power consumption, reduction in visual quality due to increased light leakage, and loss of contrast ratio and dynamic range. To try and optimize backlight power levels, the TCON would need luminance information for each segment ahead of time before the pixels are activated. This requires buffering the frame in the TCON, determining the max luminance, and then driving the pixels, which leads to added latency, and a sub-optimal user experience. The current approach generally used is to set the next displayed frame backlight based on the current displayed frame's per-segment luminance plus a conservative margin which often results in driving the backlight fifty percent brighter than necessary. What is needed is a system and method to help allow for per-segment change detection of a next displayed frame fora multi-segmented backlight.

A system, method, apparatus, means, etc. to help provide for per-segment change detection of a next displayed frame for a multi-segmented backlight can resolve these issues (and others). In an example, an electronic device (e.g., electronic device 102) can include a display engine (e.g., the display engine 108) and a display (e.g., the display panel 110). The display engine can support HDR and can include a backlight segment change engine (e.g., the backlight segment change engine 112). The display panel can include a TCON (e.g., the TCON 116), a backlight (e.g., the display backlight 118), a display backplane (e.g., the display backplane 204, shown in FIG. 2), and an LC panel (e.g., the LC panel 206, shown in FIG. 2). The TCON can include a backlight engine (e.g., the backlight engine 122). The display backlight can include backlight segments (e.g., backlight segments 124*a*-124*d*). The display engine can communicate with the display panel using a display interface (e.g., the display interface 126).

The display engine can determine the portions of a next displayed frame that are part of the image being displayed to a user where the content will not change. For the portions of the image being displayed to the user that do not change, the power level of the backlight in those portions can be accurately determined based on the power level of the backlight in those portions for the current displayed frame, without the need for an additional margin, leading to power savings and improved visual experience. However, the display engine does not have the current displayed frame information when processing the next frame to be displayed so the display engine has to use other information to derive areas in the current processed frame that changed from the last processed frame. By deriving the areas in the current processed frame that changed from the last processed frame, the areas that did not change can be determined and the zones where the areas that did not change can be determined. The power level of the zones where the areas did not change can be accurately controlled because the luminance values from the current displayed frame can be used for the next displayed frame.

To help determine the backlight segments where luminance will not change, or will change, the display engine can read the backlight segment dimensions read from the display panel's EDID/DisplayID. The display engine can analyze if the current displayed frame's luminance can be reused for each backlight zone of the next displayed frame based on tracking changes to the current processed frame as compared to the previous processed frame. More specifically, one or more processors (e.g., a central processing unit) and/or the display engine can use track flip programming, flip dirty-rectangle programming, if any multiple plane overlay planes are flipped, track pipe/plane scaler usage to identify unchanged segments, or some other means to track changes to the current processed frame as compared to the previous processed frame. For example, if track flip programming is used to track changes to the current processed frame as compared to the previous processed frame, if there are no new flip programming from the graphics driver, then the current displayed frame's luminance values can used for the next displayed frame. Also, any multiple plane overlay planes that are flipped can be used to track changes to the current processed frame as compared to the last processed frame, by determining what planes are flipped and use the coordinates of the overlay planes and the size of the overlay planes to identify the updated regions.

The term "flip" and its derivatives (e.g., "flipping," "flipped," etc.) includes swapping between a complete buffer and an in-progress buffer. When flipping is enabled, buffer swaps can be performed by changing which buffer is scanned out rather than copying the back buffer contents to the front buffer. This is generally a higher performance mechanism and allows tearless swapping during the vertical retrace. Page flipping is a relatively simple hardware-assisted technique for flicker-free graphics. To help enable flipping, the video subsystem must have at least two areas of memory (pages) that can potentially be visible, of which only one is visible at any given moment. The video subsystem supports some means to select which of the two pages is visible. This is usually just a single instruction to the hardware, and the switch is nearly instantaneous, because the hardware simply stops scanning one page and starts scanning the other page. The concept behind flipping is that at any given moment only one page visible, while on the other page is rendering the next frame. Once the frame is done rendering, the instruction is sent that instantaneously "flips" the visible page, which means that the page where the rendering was done now becomes visible, while the page that used to be visible becomes invisible and available to render the next frame. The process is repeated for each frame, always rendering on the invisible page while the user is seeing the visible page.

In an illustrated example of two pages, "A" and "B," in the beginning both pages are blank and page A is visible while page B is invisible. A graphics frame is rendered on page B, which is invisible, so initially the user does not see page B. Once the rendering of the frame is done in page B, an instruction is sent to flip the pages. The user now starts seeing the rendering on page B. The next frame is rendered on invisible page A, so the user does not see the rendering taking place as that would be perceived as flicker. Once the rendering is done on page A, the pages are flipped again, so now the user can see the newly rendered page A, while the previously visible page B now becomes invisible and available for rendering the next frame and the process is repeated for each frame.

In flip dirty-rectangle programming, if there is a full frame buffer, the flip dirty-rectangle will indicate what part of the frame buffer changed. Basically, a flip dirty-rectangle means a part of the screen has to be re-drawn (i.e., changed). For example, if a window moves from point A to point B, a "dirty" rectangle, or rect, is the window that needs to be updated. The flip dirty-rectangle is used so the system does not have to redraw the entire screen each time, just the "dirty" parts that have changed and need to be redraw.

In some examples, multi-layer compositing may be used where the image displayed to the user includes two or more separate layers. For example, one layer may be a background layer and a second layer may be a print layer. The display engine can read the two or more layers from separate buffers or the two or more layers can be from one buffer, combine the two or more layers, and send the combined two or more layers to the display panel. If any of the two or more separate layers or multiple plane overlay planes are flipped, based on tracking what layers are flipped and the coordinates of the layers that were flipped, the display engine can communicate to the TCON an indicator or identifier that indicates or identifies the backlight segments where the luminance values change and/or the backlight segments that are static with no change in luminance.

For each backlight segment, an indicator or identifier is set that indicates or identifies the backlight segments where the luminance values change and/or the backlight segments that are static with no change in luminance. In a specific example, a luminance_changed flag can be set for each segment based on the tracked changes as described herein. The flag can be set for all segments where the luminance changed meaning the segments where there is a luminance change, the luminance_changed flag can be set to "1" while the luminance_changed flag for the segments where the luminance did not change can be set to "0" (1 bit per zone). The display engine can populate an SDP with the luminance_changed flag for each backlight segment. With one bit per zone, the display engine will be transmitting 384 bits over SDP for a 384-zone panel array. When the luminance_changed flag is not set for a segment (e.g., the luminance_changed flag is set to "0"), it is a clear indication that the display panel can drive the segment's backlight for the next displayed frame exactly based on the luminance computed from the current displayed frame without the extra margin. For segments where the luminance_changed is set (e.g., the luminance_changed flag is set to "1"), the display panel may choose to drive extra backlight power in anticipation of potentially brighter pixels.

In some examples, the display panel can be an LCD panel that has high dynamic range and consumes a relatively low amount of power. The range between the very bright pixels and very dark pixels is the dynamic range and a high dynamic range means there is a relatively large difference or contract between very bright pixels and very dark pixels. If there is a uniform light, then the display would not have an acceptable level of contrast.

One way to achieve the acceptable level of contrast is to use local dimming across a plurality of zones to help achieve the very dark pixels. Local dimming is a process where there is not any light or a relatively low amount of light from the display backlight in a zone that should have very dark pixels. When a zone requires very bright pixels, relatively high levels of light can be generated by the display backlight. Using local dimming can also save power as light from the display backlight is not being generated when it is not needed. To create more zones for local dimming, microLEDs may be used where local dimming can be achieved at a micrometer size.

Figure 2:
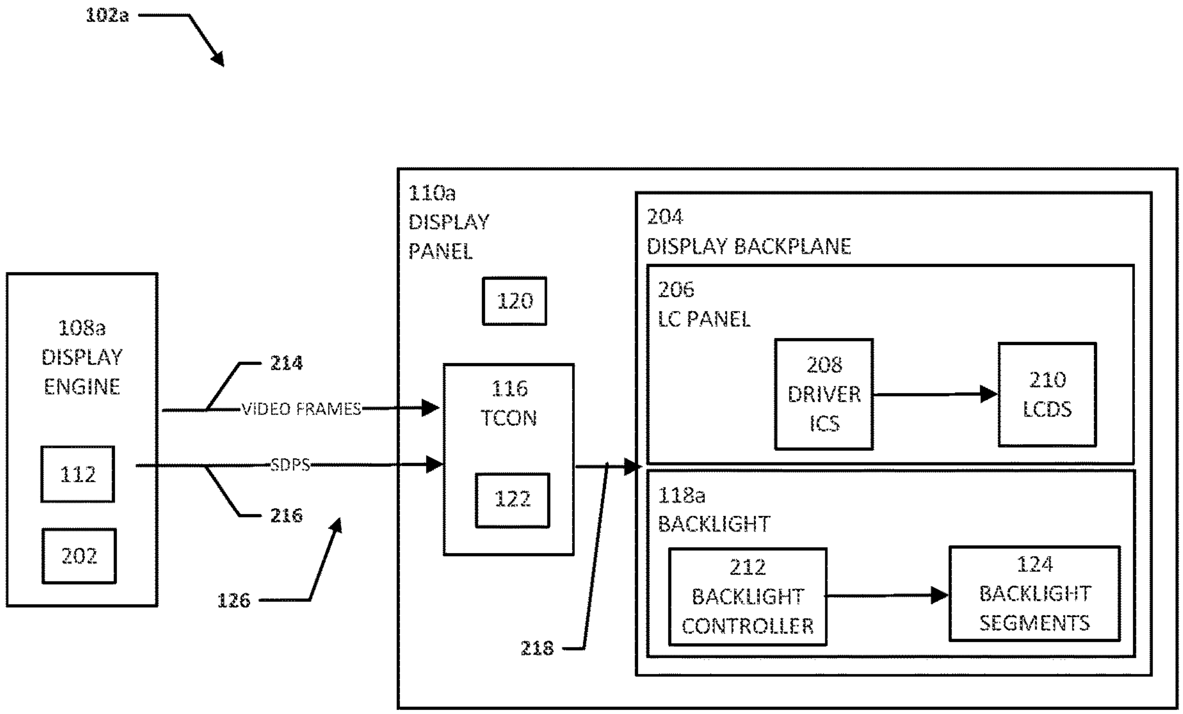
FIG. 2 is a simplified block diagram illustrating example details of a portion of a system to enable per-segment change detection for a multi-segmented backlight, in accordance with an embodiment of the present disclosure.

Turning to FIG. 2, FIG. 2 is a simple block diagram illustrating example details of a portion of a system configured to help allow for per-segment change detection for a multi-segmented backlight, in accordance with an embodiment of the present disclosure. As illustrated in FIG. 2, an electronic device **102*a* can include a display engine 108*a* and a display panel 110*a*. The display engine 108*a* can include the backlight segment change engine 112 and a determined display specification 202. The display panel 110*a* can include the TCON 116, the display specification 120, and a display backplane 204. The display backplane 204 can be the backplane that includes the materials and assembly designs used for the thin film transistors responsible for turning individual pixels on and off to enable an image to be shown on the display panel 110*a* for viewing by a user. For example, the display backplane can include an LC panel 206 and the display backlight 118*a*. The LC panel 206 can include driver integrated circuits 208 and LCDs 210 in addition to polarizing filter film (not shown) and a glass substrate (not shown). The display backlight 118*a* can include a backlight controller 212 and the backlight segments 124. The display engine 108*a* can communicate with the display panel 110*a* using the display interface 126. More specifically, the display engine 108*a* can communicate video frames 214 and SDP 216 to the display panel 110*a* using the display interface 126. The video frames 214 include the individual pixels being sent from the display engine 108*a* to the TCON 116. The SDP 216 carry information about the frame that are not pixels (e.g., metadata about the pixels, audio packets, HDR, etc.). The SDP 216 can be secondary data packets as defined by the HDMI standard protocol. In some examples, the display panel 110*a*** can support HDR.

The video frames 214 can include video data and video frames to help display an image on the display panel **110*a*. The TCON 116 receives the video data and video frames from the display interface 126 and uses the individual frames generated by the display engine 108*a*, corrects for color and brightness, controls the refresh rate, controls power savings of the display panel 110*a*, touch (if enabled), controls the backlight, etc. and communicates a video signal 218 to the LC panel 206 and the display backlight 118*a*. The driver integrated circuits 208 in the LC panel 206 receive the video signal 218 from the TCON 116 and use the video signal 218 to control each of the LCDs 210 by applying a specific voltage to twist each LCD in the LCDs 210 to display an image on the display panel 110*a*** to the user.

Also, the backlight controller 212 in the display backlight **118*a* receives the video signal 218 from the TCON 116 and controls each of the backlight segments 124. For each backlight segment, the indicator or identifier from the display engine 108*a* can be used to help determine the backlight segments where the luminance values change and/or the backlight segments that are static with no change in luminance. For the backlight segments that are static with no change in luminance, the backlight can be set based on the previous brightness level and power can be saved because the TCON 116 can drive the backlight accurately without the need for any additional margin or headroom, leading to power savings and improved visual experience. If the indicator was not sent, the TCON 116** does not know how bright to make the backlight and will make it brighter than necessary. By sending the indicator that indicates the backlight will be the same for certain segments, the backlight can be set to the correct a brightness level.

Figure 3:
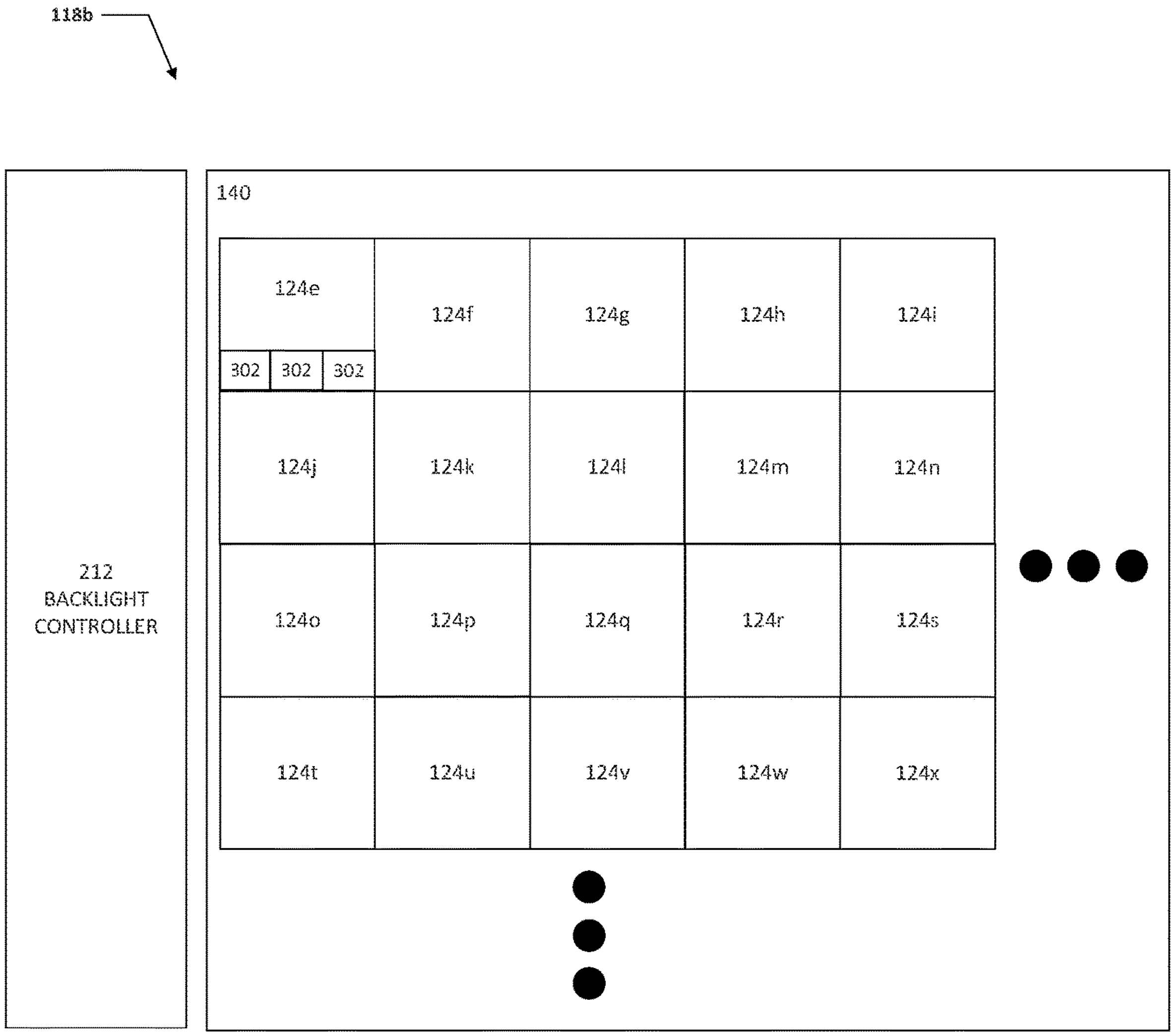
FIG. 3 is a simplified block diagram illustrating example details of a portion of a system to enable per-segment change detection for a multi-segmented backlight, in accordance with an embodiment of the present disclosure.

Turning to FIG. 3, FIG. 3 is a simple block diagram illustrating example details of a portion of a system configured to help allow for per-segment change detection for a multi-segmented backlight, in accordance with an embodiment of the present disclosure. As illustrated in FIG. 3, the display backlight 118*b* of the display backplane 204 (not shown) can include the backlight controller 212 and backlight segments 124. For example, FIG. 3 illustrates backlight segments 124*e*-124*x*. Is should be noted that the display backlight 118*b* can include more backlight segments 124 or fewer backlight segments 124 depending on design constraints and design choice. In addition, the shape of the backlight segments 124 does not need to be a rectangular profile or square profile and can be any shape or profile depending on design constraints and design choice. For example, if a display panel that included the backlight segments 124 had a round or circular shape or profile, then the backlight segments 124 could have a round or circular shape or profile. As one skilled in the art would recognize, the display backlight 118*b* is behind the LC panel 206 (illustrated in FIG. 2) and each of the LCDs 210 would be in one of the backlight segments 124*e*-124*x*. Each of the backlight segments 124*e*-124*x* can include one or more LEDs 302. When activated, the LEDs 302 create the backlight for the display panel 110*b*.

For each backlight segment, the indicator or identifier from the display engine 108*a* can be used to help determine the backlight segments where the luminance values change and/or the backlight segments that are static with no change in luminance. For the backlight segments that are static with no change in luminance, the backlight can be set based on the previous brightness level and power can be saved because the TCON 116 can drive the backlight accurately without the need for any additional margin or headroom, leading to power savings and improved visual experience. If the indicator was not sent, the TCON 116 does not know how bright to make the backlight and will make it brighter than necessary. By sending the indicator that indicates the backlight will be the same for certain segments, the backlight can be set to the correct brightness level.

Figure 4A:
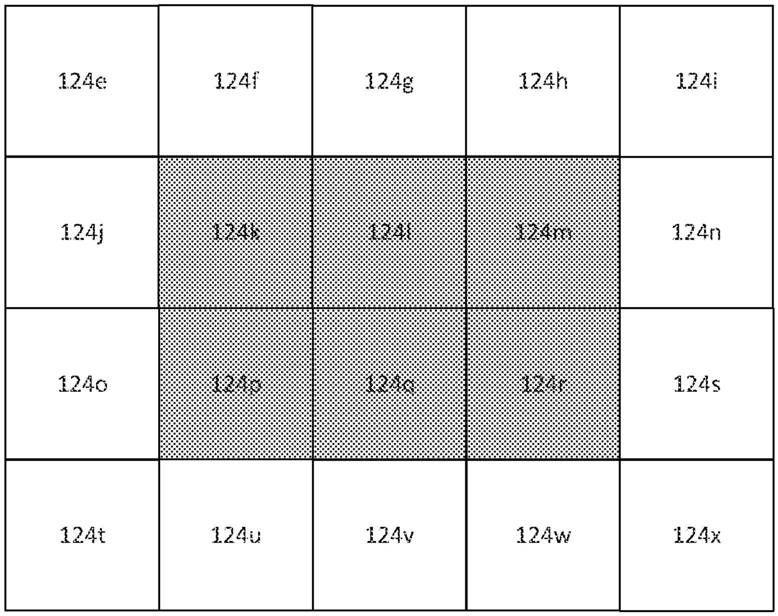
FIGS. 4A and 4B are simplified block diagrams illustrating example details of a portion of a system to enable per-segment change detection for a multi-segmented backlight, in accordance with an embodiment of the present disclosure.
Figure 4B:
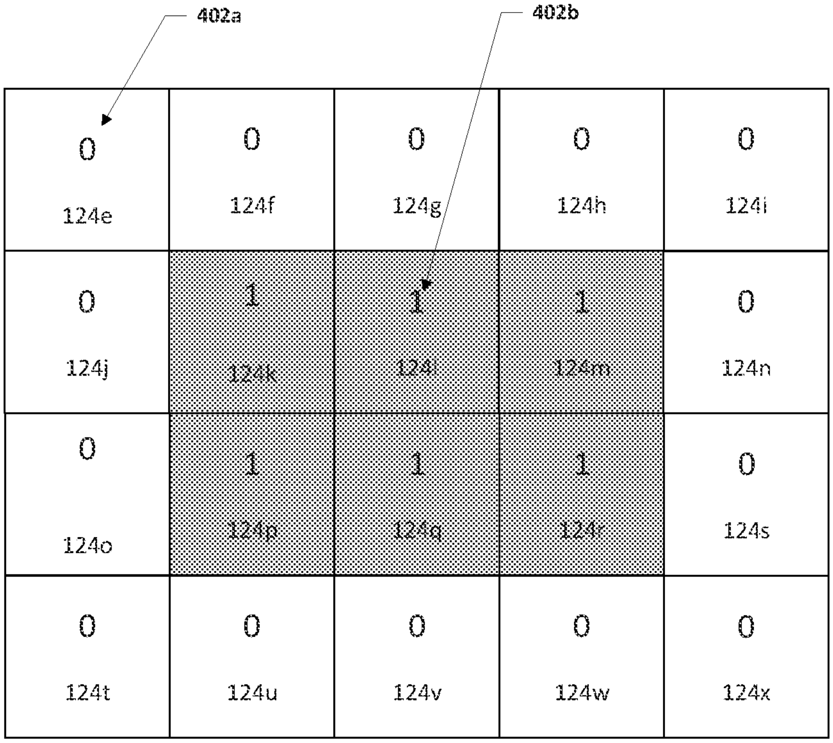

Turning to FIGS. 4A and 4B, FIGS. 4A and 4B are a simple block diagram illustrating example details of a portion of a system configured to help allow for per-segment change detection for a multi-segmented backlight, in accordance with an embodiment of the present disclosure. As illustrated in FIG. 4A, a windowed video playback scenario sample is shown below. In the illustrated windowed video playback scenario, two display planes are used in a multi-plane overlay (MPO) mode where a first display plane, in backlight segments 124*k*-124*m* and backlight segments 124*p*-124*r*, is a video plane for an active video and a second display plane, in backlight segments 124*e*-124*j*, backlight segments 124*n* and 1240, and backlight segments 124*s*-124*x*, is a desktop plane for a static background. The changing first display plane is on top or over the static second display plane. This is an example, the display engine 108 (not shown) is tracking the changes of the display based on MPO flips. In a video playback scenario, only the first display plane, backlight segments 124*k*-124*m* and backlight segments 124*p*-124*r*, changed in luminance and there is no change in luminance for the second display plane, backlight segments 124*e*-124*j*, backlight segments 124*n* and 1240, and backlight segments 124*s*-124*x*.

As illustrated in FIG. 4B, the display engine 108 (not shown) can assign an indicator or identifier 402 that indicates or identifies the backlight segments 124 where the luminance values change and/or the backlight segments 124 that are static with no change in luminance. For example, for the first display plane, backlight segments 124*k*-124*m* and backlight segments 124*p*-124*r*, where the video plane is for an active video and the luminance is changing in the next frame, an identifier 402*b* can be assigned. For the second display plane, backlight segments 124*e*-124*j*, backlight segments 124*n* and 1240, and backlight segments 124*s*-124*x*, where the desktop plane is a static background and the luminance is not changing in the next frame, an identifier 402*a* can be assigned. The assigned identifier 402 for each backlight segment 124 can be sent to the TCON 116 (not shown) to help determine the backlight segments where the luminance values change and/or the backlight segments that are static with no change in luminance. For the backlight segments that are static with no change in luminance, the backlight brightness can be set based on the previous brightness level and power can be saved because the TCON 116 (not shown) can drive the backlight brightens without the need for any additional margin or headroom, leading to power savings and improved visual experience. If the indicator was not sent, the TCON 116 (not shown) does not know how bright to make the backlight and will make it brighter than necessary. By sending the indicator that indicates the backlight will be the same for certain segments, the backlight can be set to the correct brightness level.

Figure 5:
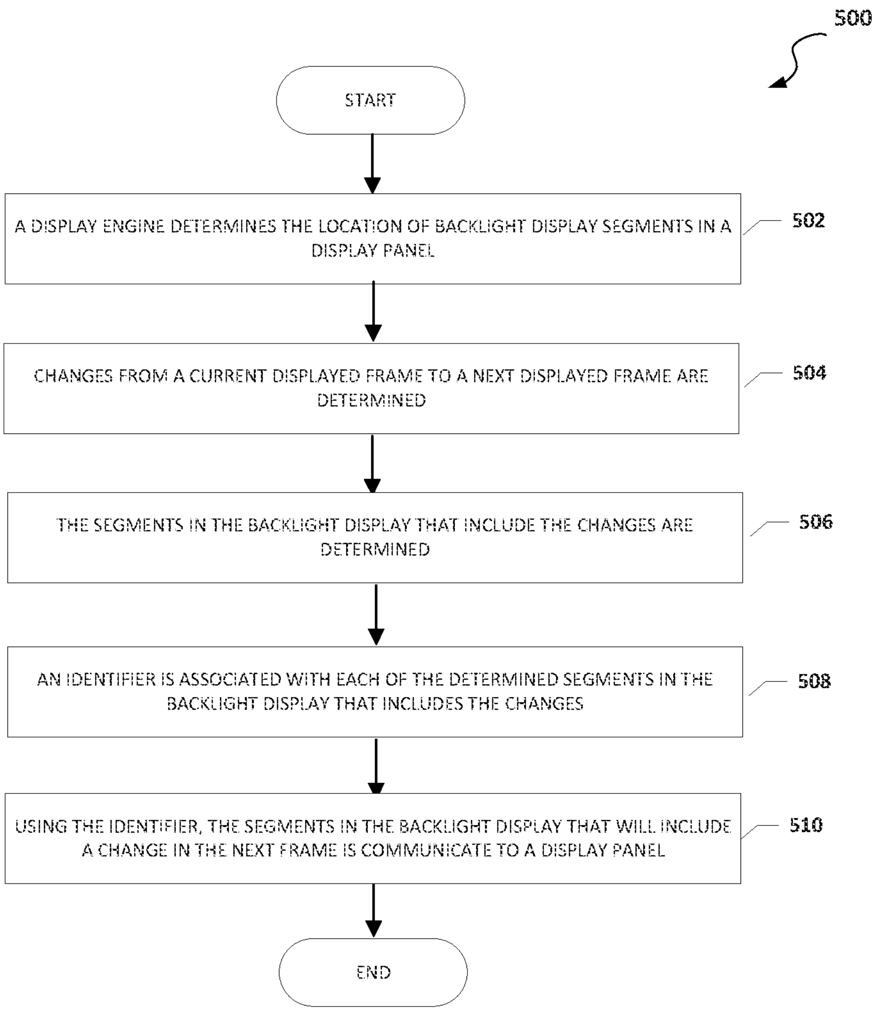
FIG. 5 is a simplified flowchart illustrating potential operations that may be associated with the system in accordance with an embodiment of the present disclosure.

Turning to FIG. 5, FIG. 5 is an example flowchart illustrating possible operations of a flow 500 that may be associated with per-segment change detection for a multi-segmented backlight, in accordance with an embodiment. In an embodiment, one or more operations of flow 500 may be performed by the display engine 108, the TCON 116, backlight segment change engine 112, and/or the backlight controller 212. At 502, a display engine determines the location of backlight display segments in a display panel. For example, the display engine 108 can read the display specification 120 in the display panel 110 to determine the location of backlight segments 124 in the display backlight 118. At 504, changes to a current displayed frame to a next displayed frame are determined. For example, the backlight segment change engine 112 can determine changes to the current processed frame as compared to the last processed frame. More specifically, the backlight segment change engine 112 can use track flip programming, flip dirty-rectangle programming, if any multiple plane overlay planes are flipped, track pipe/plane scaler usage to identify unchanged segments, or some other means to determine any the changes to the current processed frame as compared toto the last processed frame. When the current processed frame is sent to the TCON 116, the changes to the current processed frame as compared to the last processed frame become changes to a next displayed frame as compared to a current displayed frame as the TCON 116 uses the current processed frame to create the next displayed frame. At 506, the segments in the backlight display that include the changes are determined. For example, using the location of the backlight display segments 124 as determined by the display specification 120 in the display panel 110, the backlight segment change engine 112 can determine the segments in the backlight display that include the changes to the current processed frame as compared to the last processed frame. At 508, an identifier is associated with each of the determined segments in the backlight display that include the changes. In some examples, another identifier is associated with segments in the backlight display that do not include changes to the current processed frame as compared to the last processed frame. For example, the identifier 402*a* can be assigned to the backlight segments 124 that do not include the changes to the current processed frame as compared to the last processed frame and the identifier 402*b* can be assigned to the backlight segments 124 that include the changes to the current processed frame as compared to the last processed frame. At 510, using the identifier, the segments in the backlight display that will include a change in the next displayed frame are communicated to a display panel. For example, the display engine 108 can communicate the identifiers to the TCON 116 in the display panel 110 using the display interface 126. In some examples, the display engine 108 can communicate the identifiers to the TCON 116 in the display panel 110 using the SDPs 216.

Figure 6:
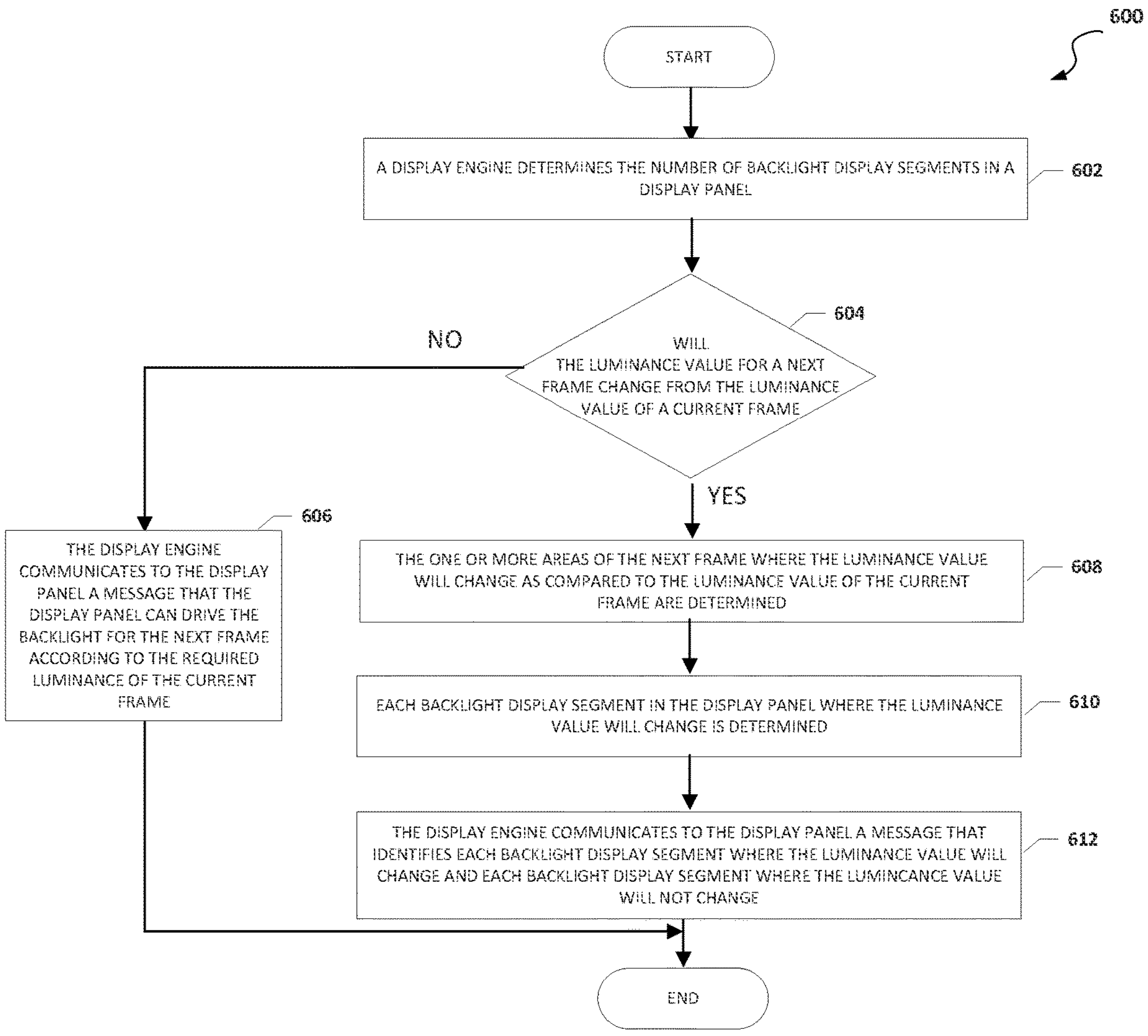
FIG. 6 is a simplified flowchart illustrating potential operations that may be associated with the system in accordance with an embodiment of the present disclosure.

Turning to FIG. 6, FIG. 6 is an example flowchart illustrating possible operations of a flow 600 that may be associated with per-segment change detection for a multi-segmented backlight, in accordance with an embodiment. In an embodiment, one or more operations of flow 600 may be performed by the one or more processors 106, the display engine 108, the TCON 116, backlight segment change engine 112, and/or the backlight controller 212. At 602, a display engine determines the location of backlight display segments in a display panel. For example, the display engine 108 can read the display specification 120 in the display panel 110 to determine the location of backlight segments 124 in the display backlight 118. At 604, the system determines if the luminance value for a next frame will change from the luminance value of a current frame. For example, the one or more processors 106 (e.g., a central processing unit) and/or the backlight segment change engine 112 can determine if any changes will occur to the current processed frame as compared to the last processed frame. More specifically, the one or more processors 106 (e.g., a central processing unit) and/or the backlight segment change engine 112 can use track flip programming, flip dirty-rectangle programming, if any multiple plane overlay planes are flipped, track pipe/plane scaler usage to identify unchanged segments, or some other means to determine if any changes in luminance will occur in the next displayed frame. If the luminance value for the next frame will not change from the luminance value of the current frame, then one or more indicators or identifiers are communicated from the display engine to a display panel to inform the display panel that the display panel can drive the backlight for the next displayed frame according to the required luminance of the current frame, as in 606. For example, the identifier 402*a* can be assigned to the backlight segments 124 that do not include the changes in the current processed frame as compared to the last processed frame and the display engine 108 can communicate the identifiers to the TCON 116 in the display panel 110 using the display interface 126. In some examples, the display engine 108 can communicate the identifiers to the TCON 116 in the display panel 110 using the SDPs 216. The TCON 116 can use the brightness level for the backlight segments 124 of the current displayed frame as the brightness level for the backlight segments 124 for the next displayed frame.

If the luminance value for the next frame will change from the luminance value of the current frame, then the one or more areas of the next frame where the luminance value will change as compared to the luminance value of the current frame are determined, as in 608. For example, the backlight segment change engine 112 can determine where the luminance value for the next displayed frame will change as compared to the luminance value of the current displayed frame. More specifically, the one or more processors 106 (e.g., a central processing unit) and/or the backlight segment change engine 112 can use track flip programming, flip dirty-rectangle programming, if any multiple plane overlay planes are flipped, track pipe/plane scaler usage to identify unchanged segments, or some other means to determine where the changes to the current processed frame as compared to the last processed frame will occur. At 610, each backlight segment in the display panel where the luminance value will change is determined. For example, using the location of backlight display segments 124 as determined by the display specification 120 in the display panel 110, the backlight segment change engine 112 can determine the segments in the backlight display that include the changes to the last processed frame as compared to the current processed frame. At 612, the display engine communicates to the display panel a message that identifies each backlight display segment where the luminance value will change and each backlight display segment where the luminance value will not change. For example, the identifier 402*b* can be assigned to the backlight segments 124 that will include the changes to the last processed frame as compared to the current processed frame and the display engine 108 can communicate the identifiers to the TCON 116 in the display panel 110 using the display interface 126. In some examples, the display engine 108 can communicate the identifiers to the TCON 116 in the display panel 110 using the SDPs 216.

Turning to FIG. 8, FIG. 8 is a simplified block diagram of example electronic devices 102*b*-102*e* configured to enable per-segment change detection for a multi-segmented backlight, in accordance with an embodiment of the present disclosure. In an example, an electronic device 102*b* can include memory 104, one or more processors 106, a display panel 110*b*, and a graphics processing unit (GPU) 714. The display panel 110*b* can include a display engine 108*b*, the TCON 116, and the display backlight 118. In some examples, the GPU 714 includes the backlight segment change engine 112 (not shown). In other examples, the display engine 108*b* includes the backlight segment change engine 112 (not shown). The display backlight 118 can include the backlight segments 124. The GPU 714 can communicate with the display engine 108*b* and the display engine 108*b* can communicate with the TCON 116 and the display backlight 118. More specifically, the display engine 108*b* can receive video data from the GPU 714 and communicate the assigned identifier 402 for each backlight segment 124 to the TCON 116.

An electronic device 102*c* can include a first housing 702 and a second housing 704. The first housing 702 is rotatably or pivotable coupled to the second housing 704 using a hinge 706. The first housing 702 can include a display panel 110*c*, the TCON 116, and the display backlight 118. The display backlight 118 can include the backlight segments 124. The second housing 704 can include memory 104, the one or more processors 106, and the display engine 108. The display engine 108 can include the backlight segment change engine 112 (not shown). In some examples, the display engine 108 can be located in the first housing 702. The display engine 108 can communicate the assigned identifier 402 for each backlight segment 124 to the TCON 116.

Figure 7:
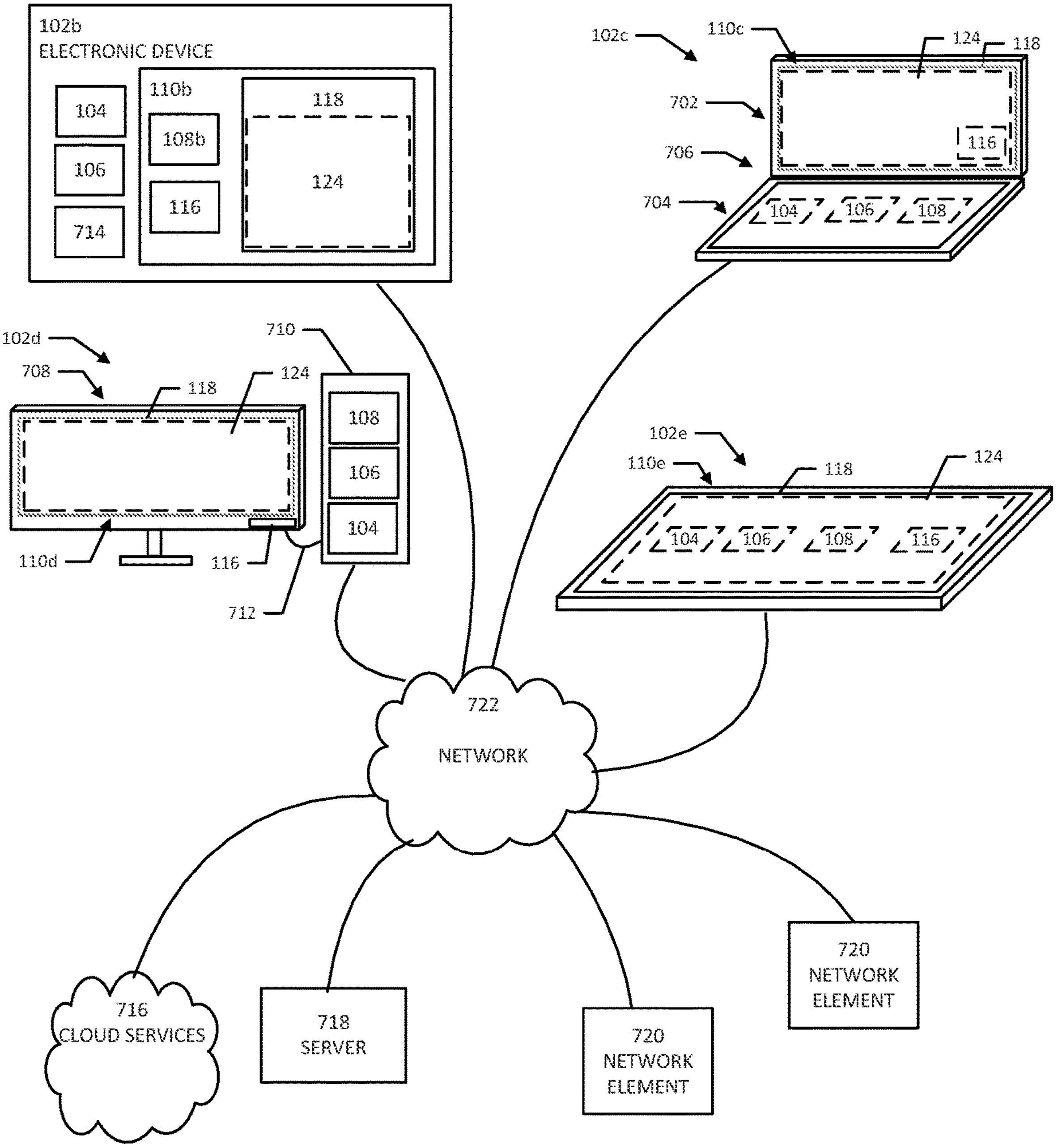
FIG. 7 is a simplified block diagram of electronic devices that includes a system to enable per-segment change detection for a multi-segmented backlight, in accordance with an embodiment of the present disclosure.

An electronic device 102*d* can include a display monitor 708 and a computing housing 710. The display monitor 708 can be a desktop display monitor, a wall hanging monitor, or some other type of display monitor. The display monitor 708 can include the display panel 110*d*, the TCON 116, and the display backlight 118. The display backlight 118 can include the backlight segments 124. The computing housing 710 may be a computer tower, small factor form computer housing, or some other type of computer housing. The computing housing 710 can include memory 104, the one or more processors 106, and the display engine 108. The display engine 108 can include the backlight segment change engine 112 (not shown). The display engine 108 can communicate the assigned identifier 402 for each backlight segment 124 to the TCON 116 using a wired or wireless connection. For example, as illustrated in FIG. 7, the computing housing 710 is in communication with the display monitor 708 using wired connection 712. In some examples, the display engine 108 can be located in the display monitor 708.

An electronic device 102*e* can include memory 104, the one or more processors 106, the display engine 108, display panel 110*e*, the TCON 116, and the display backlight 118. The display engine 108 can include the backlight segment change engine 112 (not shown). The display backlight 118 can include the backlight segments 124. The display engine 108 can communicate the assigned identifier 402 for each backlight segment 124 to the TCON 116. In some examples, the electronic device 102*e* can be a tablet computer or standalone display.

In an example, each of electronic devices 102*b*-102*e* (and electronic devices 102 and 102*a*, not shown) may be in communication with each other, cloud services 716, a server 718 and/or one or more network elements 720 using a network 722. In other examples, one or more of electronic devices 102*b*-102*e* (and electronic devices 102 and 102*a*, not shown) may be a standalone device and not in communication with the network 722. The network 722 represents a series of points or nodes of interconnected communication paths for receiving and transmitting packets of information. The network 722 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 722, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, the electronic devices 102 and 102*a*-102*e* are meant to encompass a computer, a personal digital assistant (PDA), a laptop or electronic notebook, hand held device, a cellular telephone, a smartphone, an IP phone, wearables, network elements, Internet of Things (loT) devices, network appliances, or any other device, component, element, or object that includes an LCD panel and a backlight. Each of electronic devices 102 and 102*a*-102*e* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of the electronic devices 102 and 102*a*-102*e* may include virtual elements.

In regards to the internal structure, each of the electronic devices 102 and 102*a*-102*e* can include memory elements for storing information to be used in operations. Each of the electronic devices 102 and 102*a*-102*e* may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

In an example implementation, elements of the electronic devices 102 and 102*a*-102*e* may include software modules (e.g., display engine 108, TCON 116, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of the electronic devices 102 and 102*a*-102*e* can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

It is also important to note that the operations in the preceding diagrams illustrates only some of the possible scenarios and patterns that may be executed by, or within, the electronic devices 102 and 102*a*-102*e*. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the electronic devices 102 and 102*a*-102*e* in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the electronic devices 102 and 102*a*-102*e* and their teachings are readily scalable and can accommodate a large number of components, as well as more complicated/sophisticated arrangements and configurations. Accordingly, the examples provided should not limit the scope or inhibit the broad teachings of the electronic devices 102 and 102*a*-102*e* and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic devices 102 and 102*a*-102*e* have been illustrated with reference to particular elements and operations, these elements and operations may be replaced by any suitable architecture, protocols, and/or processes that achieve the intended functionality of the electronic devices 102 and 102*a*-102*e*. For example, one skilled in the art could modify the display engine to include a full frame buffer to store a current frame and the next frame could be compared to the current frame stored in the full frame buffer to determine the changes from the current frame to the next frame. In another example, one skilled in the art could modify a TCON to include the display engine by increasing the TCON buffer to a full frame buffer and other modifications to enable the TCON to determine per-segment change detection for a multi-segmented backlight in accordance with an embodiment of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a display panel that includes a segmented backlight and a display engine where, for each segment in the segmented backlight, the display engine communicates to the display panel an identifier that indicates if a brightness value of the segment in a current processed frame in a video stream will change from a brightness value of the segment in a last processed frame in the video stream.

In Example A2, the subject matter of Example A1 can optionally include where track flip programming is at least partially used to determine what segment in the segmented backlight will change the brightness value.

In Example A3, the subject matter of Example A1 can optionally include where flip dirty-rectangle programming is at least partially used to determine what segment in the segmented backlight will change the brightness value.

In Example A4, the subject matter of Example A1 can optionally include where one or more planes that flipped in a multiple plane overlay are at least partially used to determine what segment in the segmented backlight will change the brightness value.

In Example A5, the subject matter of Example A1 can optionally include where pipe/plane scale usage is at least partially used to determine what segment in the segmented backlight will change the brightness value.

In Example A6, the subject matter of Example A1 can optionally include where the identifier is communicated to the display panel using a secondary data packet in the video stream.

In Example A7, the subject matter of Example A1 can optionally include where the display panel includes a timing controller (TCON) and the display engine communicates the identifier for each segment in the segmented backlight to the TCON.

In Example A8, the subject matter of Example A1 can optionally include where the display engine communicates to the TCON a second identifier that indicates each segment in the segmented backlight where the brightness value of the segment in the next displayed frame will not change.

In Example A9, the subject matter of Example A1 can optionally include where for each segment where the brightness value for the segment will not change in the next displayed frame, the brightness value of the segment for the current displayed frame is used.

In Example A10, the subject matter of Example A1 can optionally include where the display panel includes a backlight controller wherein the backlight controller controls the brightness of each segment in the backlight.

In Example A11, the subject matter of Example A1 can optionally include where the display panel includes a liquid crystal display.

In Example A12, the subject matter of Example A1 can optionally include where the display engine determines a location of each segment in the segmented backlight using a display specification stored in the display panel.

In Example A13, the subject matter of any one of Examples A1-A2 can optionally include where flip dirty-rectangle programming is at least partially used to determine what segment in the segmented backlight will change the brightness value.

In Example A14, the subject matter of any one of Examples A1-A3 can optionally include where one or more planes that flipped in a multiple plane overlay are at least partially used to determine what segment in the segmented backlight will change the brightness value.

In Example A15, the subject matter of any one of Examples A1-A4 can optionally include where track pipe/plane scaler usage to identify unchanged segments is at least partially used to determine what segment in the segmented backlight will change the brightness value.

In Example A16, the subject matter of any one of Examples A1-A5 can optionally include where the identifier is communicated to the display panel using a secondary data packet in the video stream.

In Example A17, the subject matter of any one of Examples A1-A6 can optionally include where the display panel includes a timing controller (TCON) and the display engine communicates the identifier for each segment in the segmented backlight to the TCON.

In Example A18, the subject matter of any one of Examples A1-A7 can optionally include where the display engine communicates to the TCON a second identifier that indicates each segment in the segmented backlight where the brightness value of the segment in the next displayed frame will not change.

In Example A19, the subject matter of any one of Examples A1-A8 can optionally include where for each segment where the brightness value for the segment will not change in the next displayed frame, the brightness value of the segment for the current displayed frame is used.

In Example A20, the subject matter of any one of Examples A1-A9 can optionally include where the display panel includes a backlight controller wherein the backlight controller controls the brightness of each segment in the backlight.

In Example A21, the subject matter of any one of Examples A1-A10 can optionally include where the display panel includes a liquid crystal display.

In Example A22, the subject matter of any one of Examples A1-A11 can optionally include where the display engine determines a location of each segment in the segmented backlight using a display specification stored in the display panel.

Example M1 is a method including determining a location of backlight display segments in a display panel, determining changes of a current processed frame as compared to a last processed frame, and determining the backlight display segments that include the changes of the current processed frame as compared to the last processed frame.

In Example M2, the subject matter of Example M1 can optionally include for each backlight segment, assigning an identifier that indicates if the backlight segment includes changes in the current processed frame as compared to the last processed frame and communicating the assigned identifier for each backlight segment to a timing controller (TCON).

In Example M3, the subject matter of Example M1 can optionally include where the assigned identifier for each backlight segment is communicated from a display engine to the TCON using a secondary data packet.

In Example M4, the subject matter of Example M1 can optionally include where the TCON uses the assigned identifier for each backlight segment to determine if a brightness of a specific segment for the next displayed frame can be a same level as a brightness of the specific segment for the current displayed frame.

In Example M5, the subject matter of Example M1 can optionally include where track flip programming is at least partially used to determine the changes of the current processed frame as compared to the last processed frame.

In Example, M6, the subject matter of Example M1 can optionally include where flip dirty-rectangle programming is at least partially used to determine the changes of the current processed frame as compared to the last processed frame.

In Example, M7, the subject matter of Example M1 can optionally include where determining if any multiple plane overlay planes are flipped is at least partially used to determine the changes of the current processed frame as compared to the last processed frame.

In Example, M8, the subject matter of Example M1 can optionally include where the location of backlight display segments in the display panel is determined by reading a display panel specification.

In Example M9, the subject matter of any one of the Examples M1-M2 can optionally include where the assigned identifier for each backlight segment is communicated from a display engine to the TCON using a secondary data packet.

In Example M10, the subject matter of any one of the Examples M1-M3 can optionally include where the TCON uses the assigned identifier for each backlight segment to determine if a brightness of a specific segment for the next displayed frame can be a same level as a brightness of the specific segment for the current displayed frame.

In Example M11, the subject matter of any one of the Examples M1-M4 can optionally include where track flip programming is at least partially used to determine the changes of the current processed frame as compared to the last processed frame.

In Example, M12, the subject matter of any one of the Examples M1-M5 can optionally include where flip dirty-rectangle programming is at least partially used to determine the changes of the current processed frame as compared to the last processed frame.

In Example, M13, the subject matter of any one of the Examples M1-M6 can optionally include where determining if any multiple plane overlay planes are flipped is at least partially used to determine the changes of the current processed frame as compared to the last processed frame.

In Example, M14, the subject matter of any one of the Examples M1-M7 can optionally include where the location of backlight display segments in the display panel is determined by reading a display panel specification.

Example AA1 is an electronic device including a display panel and a display engine. The display panel includes a liquid crystal display, a backlight for the liquid crystal display, where the backlight includes a plurality of backlight segments, and a timing controller (TCON). The display engine is located outside of the display panel, wherein the display engine communicates to the TCON an identifier for each of the plurality of backlight segments, wherein the identifier indicates if the backlight segment associated with the identifier includes changes of a next frame as compared to a current frame.

In Example AA2, the subject matter of Example AA1 can optionally include where the display panel further includes a display specification and the display engine determines the backlight segment dimensions of the plurality of backlight segments using the display specification.

In Example AA3, the subject matter of Example AA1 can optionally include where the identifier for each of the plurality of backlight segments is communicated from the display engine to the TCON using a secondary data packet.

In Example AA4, the subject matter of Example AA1 can optionally include where the TCON uses the identifier for each of the plurality of backlight segments to determine if a brightness of a specific backlight segment for the next frame can be a same level as a brightness of the specific backlight segment for the current frame.

In Example AA5, the subject matter of Example AA1 can optionally include where track flip programming is at least partially used to determine what segment in the segmented backlight includes changes of a next frame as compared to a current frame.

In Example AA6, the subject matter of Example AA1 can optionally include where flip dirty-rectangle programming is at least partially used to determine what segment in the segmented backlight includes changes of a next frame as compared to a current frame.

In Example AA7, the subject matter of Example AA1 can optionally include where determining if any multiple plane overlay planes are flipped is at least partially used to determine what segment in the segmented backlight includes changes of a next frame as compared to a current frame.

In Example AA8, the subject matter of Example AA1 can optionally include where track pipe/plane scaler usage to identify unchanged segments is at least partially used to determine what segment in the segmented backlight includes changes of a next frame as compared to a current frame.

In Example AA9, the subject matter of Example AA1 can optionally include where the display panel can support high dynamic range.

In Example AA10, the subject matter of any one of Examples AA1-AA2 can optionally include where the identifier for each of the plurality of backlight segments is communicated from the display engine to the TCON using a secondary data packet.

In Example AA11, the subject matter of any one of Examples AA1-AA3 can optionally include where the TCON uses the identifier for each of the plurality of backlight segments to determine if a brightness of a specific backlight segment for the next frame can be a same level as a brightness of the specific backlight segment for the current frame.

In Example AA12, the subject matter of any one of Examples AA1-AA4 can optionally include where track flip programming is at least partially used to determine what segment in the segmented backlight includes changes of a next frame as compared to a current frame.

In Example AA13, the subject matter of any one of Examples AA1-AA5 can optionally include where flip dirty-rectangle programming is at least partially used to determine what segment in the segmented backlight includes changes of a next frame as compared to a current frame.

In Example AA14, the subject matter of any one of Examples AA1-AA6 can optionally include where determining if any multiple plane overlay planes are flipped is at least partially used to determine what segment in the segmented backlight includes changes of a next frame as compared to a current frame.

In Example AA15, the subject matter of any one of Examples AA1-AA7 can optionally include where track pipe/plane scaler usage to identify unchanged segments is at least partially used to determine what segment in the segmented backlight includes changes of a next frame as compared to a current frame.

In Example AA16, the subject matter of any one of Examples AA1-AA8 can optionally include where the display panel can support high dynamic range.

Example S1 is a system that includes means to determine a location of backlight display segments in a display panel, means to determine changes of a current processed frame as compared to a last processed frame, and means to determine the backlight display segments that include the changes of the current processed frame as compared to the last processed frame.

In Example S2, the subject matter of Example S1 can optionally include for each backlight segment, means to assign an identifier that indicates if the backlight segment includes changes in the current processed frame as compared to the last processed frame and means to communicate the assigned identifier for each backlight segment to a timing controller (TCON).

In Example S3, the subject matter of Example S1 can optionally include where the assigned identifier for each backlight segment is communicated from a display engine to the TCON using a secondary data packet.

In Example S4, the subject matter of Example S1 can optionally include where the TCON uses the assigned identifier for each backlight segment to determine if a brightness of a specific segment for the next displayed frame can be a same level as a brightness of the specific segment for the current displayed frame.

In Example S5, the subject matter of Example S1 can optionally include where track flip programming is at least partially used to determine the changes of the current processed frame as compared to the last processed frame.

In Example S6, the subject matter of Example S1 can optionally include where flip dirty-rectangle programming is at least partially used to determine the changes of the current processed frame as compared to the last processed frame.

In Example S7, the subject matter of Example S1 can optionally include where wherein determining if any multiple plane overlay planes are flipped is at least partially used to determine the changes of the current processed frame as compared to the last processed frame.

In Example S8, the subject matter of Example S1 can optionally include where the location of backlight display segments in the display panel is determined by reading a display panel specification.

In Example S9, the subject matter of any one of the Examples S1-52 can optionally include where the assigned identifier for each backlight segment is communicated from a display engine to the TCON using a secondary data packet.

In Example S10, the subject matter of any one of the Examples S1-53 can optionally include where the TCON uses the assigned identifier for each backlight segment to determine if a brightness of a specific segment for the next displayed frame can be a same level as a brightness of the specific segment for the current displayed frame.

In Example S11, the subject matter of any one of the Examples S1-S4 can optionally include where track flip programming is at least partially used to determine the changes of the current processed frame as compared to the last processed frame.

In Example S12, the subject matter of any one of the Examples S1-S5 can optionally include where flip dirty-rectangle programming is at least partially used to determine the changes of the current processed frame as compared to the last processed frame.

In Example S13, the subject matter of any one of the Examples S1-S6 can optionally include where determining if any multiple plane overlay planes are flipped is at least partially used to determine the changes of the current processed frame as compared to the last processed frame.

In Example S14, the subject matter of any one of the Examples S1-S7 can optionally include where the location of backlight display segments in the display panel is determined by reading a display panel specification.

Example X1 is a machine-readable storage medium including machine-readable instructions to implement a method or realize an apparatus as in any one of the Examples A1-A22, M1-M14, AA1-AA16, or S1-S14. Example Y1 is an apparatus comprising means for performing any of the Example methods M1-M14. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:

a display panel that includes a segmented backlight having a plurality of segments; and a display engine, wherein, for each segment in the segmented backlight, the display engine creates and communicates to the display panel an identifier that indicates if a brightness value of a specific segment in a current processed frame in a video stream will change from a brightness value of the specific segment in a last processed frame in the video stream.

2. The electronic device of claim 1, wherein track flip programming is at least partially used to determine if the brightness value of the specific segment in the segmented backlight will change from the brightness value of the specific segment in the last processed frame.

3. The electronic device of claim 1, wherein flip dirty-rectangle programming is at least partially used to determine if the brightness value of the specific segment in the segmented backlight will change from the brightness value of the specific segment in the last processed frame.

4. The electronic device of claim 1, wherein one or more planes that flipped in a multiple plane overlay are at least partially used to determine if the brightness value of the specific segment in the segmented backlight will change from the brightness value of the specific segment in the last processed frame.

5. The electronic device of claim 1, wherein track pipe/plane scaler usage to identify unchanged segments is at least partially used to determine if the brightness value of the specific segment in the segmented backlight will change from the brightness value of the specific segment in the last processed frame.

6. The electronic device of claim 1, wherein the identifier is communicated to the display panel using a secondary data packet in the video stream.

7. The electronic device of claim 1, wherein the display panel includes a timing controller (TCON) and the display engine communicates to the TCON a second identifier that indicates each segment in the segmented backlight where the brightness value of the segment in a next displayed frame will not change.

8. The electronic device of claim 7, wherein for each segment where the brightness value for the segment will not change in the next displayed frame, the brightness value of the segment for a current displayed frame is used.

9. The electronic device of claim 1, wherein the display engine determines a location of each segment in the segmented backlight using a display specification stored in the display panel.

10. A method comprising:

determining a location of a plurality of backlight segments in a display panel;

determining changes to a current processed frame as compared to a last processed frame; and determining backlight segments that include the changes of the current processed frame as compared to the last processed frame.

11. The method of claim 10, further comprising:

for each of the plurality of backlight segments, assigning an identifier that indicates if the backlight segment includes changes in the current processed frame as compared to the last processed frame, wherein the assigned identifier for each backlight segment is communicated from a display engine to a timing controller (TCON) using a secondary data packet.

12. The method of claim 11, wherein the TCON uses the assigned identifier for each backlight segment to determine if a brightness of a specific segment for a next displayed frame can be a same level as a brightness of the specific segment for a current displayed frame.

13. The method of claim 10, wherein track flip programming is at least partially used to determine the changes to the current processed frame as compared to the last processed frame.

14. The method of claim 10, wherein flip dirty-rectangle programming is at least partially used to determine the changes to the current processed frame as compared to the last processed frame.

15. The method of claim 10, wherein determining if any multiple plane overlay planes are flipped is at least partially used to determine the changes to the current processed frame as compared to the last processed frame.

16. An electronic device comprising:

a display panel, wherein the display panel includes:

a liquid crystal display;

a backlight for the liquid crystal display, wherein the backlight includes a plurality of backlight segments;

a timing controller (TCON); and a display engine located outside of the display panel, wherein the display engine communicates to the TCON an identifier for each of the plurality of backlight segments, wherein the identifier indicates if the backlight segment associated with the identifier includes changes of a next frame as compared to a current frame.

17. The electronic device of claim 16, wherein the display panel further includes a display specification and the display engine determines backlight segment dimensions of the plurality of backlight segments using the display specification.

18. The electronic device of claim 16, wherein the identifier for each of the plurality of backlight segments is communicated from the display engine to the TCON using a secondary data packet.

19. The electronic device of claim 16, wherein the TCON uses the identifier for each of the plurality of backlight segments to determine if a brightness of a specific backlight segment for the next frame can be a same level as a brightness of the specific backlight segment for the current frame.

20. The electronic device of claim 16, wherein the display panel can support high dynamic range.

* * * * *